INVENTORS:
James E. Kinzie
John W. Pross, Jr.
Robert B. Steves
Arville T. Trostrud By Attorney INVENTORS
James E. Kinzie
John W. Pross, Jr.
Robert B. Steves
Arville T. Trostrud
By [signature]
Attorney INVENTORS
JAMES E. KINZIE
JOHN W. PROSS, JR.
ROBERT B. STEVES
ARVILLE T. TROSTRUD INVENTORS:
James E. Kinzie
John W. Pross, Jr.
Robert B. Steyes
Arville T. Trostrud
By [signature]
Attorney INVENTORS
James E. Kinzie
John W. Pross, Jr.
Robert B. Steves
Arville T. Trostrud
By [signature]
Attorney INVENTORS:
James E. Kinzie
John W. Pross, Jr.
Robert B. Steves
Arville T. Trostrud
By [signature]
Attorney (Multiply Lw)

2 1

A26 - A27
C26 - C27 ← This Row = 0 if $\overline{B27}$ = 1
+ C27 - 0 ← This Row = 0 if $\overline{B26}$ = 1

The Sum of Column 2 Should be "1" under the following circumstances

| B27 | B26 | A26 | A27 | C26 | C27 |
|---|---|---|---|---|---|
| 0 | 0 | 1 | X | X | X |
| 0 | 1 | 1 | X | X | 0 |
| 0 | 1 | 0 | X | X | 1 |
| 1 | 0 | 0 | 0 | 1 | X |
| 1 | 0 | 0 | X | 1 | 0 |
| 1 | 0 | 1 | 0 | 0 | X |
| 1 | 0 | 1 | X | 0 | 0 |
| 1 | 0 | 0 | 1 | 0 | 1 |
| 1 | 0 | 1 | 1 | 1 | 1 |
| 1 | 1 | 1 | 1 | 0 | X |
| 1 | 1 | 1 | X | 0 | 0 |
| 1 | 1 | 0 | 1 | 1 | X |
| 1 | 1 | 0 | X | 1 | 0 |
| 1 | 1 | 0 | 0 | 0 | 1 |
| 1 | 1 | 1 | 0 | 1 | 1 |

(Determination of Second LSB for Aw MUL)

INVENTORS
James E. Kinzie
John W. Pross, Jr.
Robert B. Steves
Arville T. Trostrud
By
Attorney

Fig. 9C (Three Input Adder)

| Op1 | Op2 | Op3 | $Ca_1^n$ | $Ca_2^n$ | $Ca_1^{n+1}$ | $Ca_2^{n+1}$ | S |
|---|---|---|---|---|---|---|---|
| 0 | 0 | 0 | 0 | 0 | 0 | 0 | 0 |
| 0 | 0 | 1 | 0 | 0 | 0 | 0 | 1 |
| 0 | 1 | 0 | 0 | 0 | 0 | 0 | 1 |
| 0 | 1 | 1 | 0 | 0 | 1 | 0 | 0 |
| 1 | 0 | 0 | 0 | 0 | 0 | 0 | 1 |
| 1 | 0 | 1 | 0 | 0 | 1 | 0 | 0 |
| 1 | 1 | 0 | 0 | 0 | 1 | 0 | 0 |
| 1 | 1 | 1 | 0 | 0 | 1 | 0 | 1 |
| 0 | 0 | 0 | 1 | 0 | 0 | 0 | 1 |
| 0 | 0 | 1 | 1 | 0 | 1 | 0 | 0 |
| 0 | 1 | 0 | 1 | 0 | 1 | 0 | 0 |
| 0 | 1 | 1 | 1 | 0 | 1 | 0 | 1 |
| 1 | 0 | 0 | 1 | 0 | 1 | 0 | 0 |
| 1 | 0 | 1 | 1 | 0 | 1 | 0 | 1 |
| 1 | 1 | 0 | 1 | 0 | 1 | 0 | 1 |
| 1 | 1 | 1 | 1 | 0 | 0 | 1 | 0 |
| 0 | 0 | 0 | 0 | 1 | 1 | 0 | 0 |
| 0 | 0 | 1 | 0 | 1 | 1 | 0 | 1 |
| 0 | 1 | 0 | 0 | 1 | 1 | 0 | 1 |
| 0 | 1 | 1 | 0 | 1 | 0 | 1 | 0 |
| 1 | 0 | 0 | 0 | 1 | 1 | 0 | 1 |
| 1 | 0 | 1 | 0 | 1 | 0 | 1 | 0 |
| 1 | 1 | 0 | 0 | 1 | 0 | 1 | 0 |
| 1 | 1 | 1 | 0 | 1 | 0 | 1 | 1 |

Fig. 9B (Presetting of Ca1 for Aw MuL)

```
                  3   2   1
  . . . . . . .  A25 A26
  . . . . . . .  C25 C26  <---- This row = 0 if ‾B26‾ = 1
+ . . . . . . .  C26 0    <---- This row = 0 if B25 = 1
```

A Carry should be generated into Column 3 under following circumstances

| B26 | B25 | A25 | A26 | C25 | C26 |
|---|---|---|---|---|---|
| 0 | 1 | 1 | X | X | 1 |
| 1 | 0 | 1 | X | 1 | X |
| 1 | 0 | 1 | 1 | X | 1 |
| 1 | 0 | X | 1 | 1 | 1 |
| 1 | 1 | 0 | 1 | X | 1 |
| 1 | 1 | 1 | 0 | X | 1 |
| 1 | 1 | 1 | X | 1 | 0 |
| 1 | 1 | X | 0 | 1 | 1 |
| 1 | 1 | X | 1 | 0 | 1 |

INVENTORS
James E. Kinzie
John W. Pross, Jr.
Robert B. Steves
Arville T. Trostrud By [illegible]
Attorneys INVENTORS
James E. Kinzie
John W. Pross, Jr.
Robert B. Steves
Arville T. Trostrud
By [signature]
Attorney INVENTORS
James E. Kinzie
John W. Pross, Jr.
Robert B. Steves
Arville T. Trostrud
By [signature]
Attorney Fig. 13
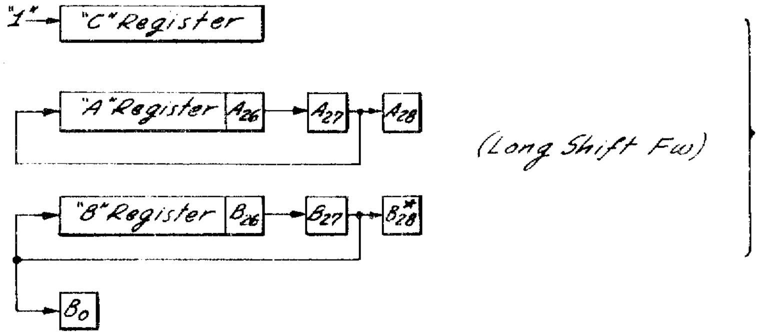
Fig. 14
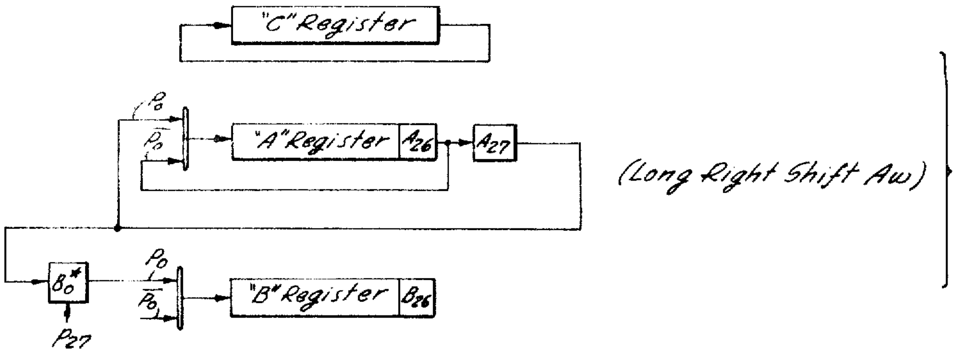
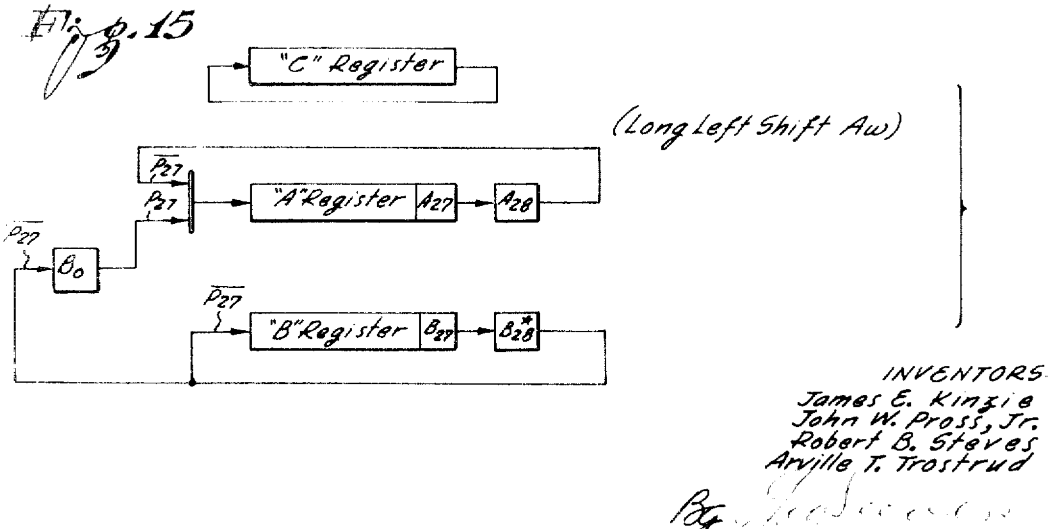
INVENTORS
James E. Kinzie
John W. Pross, Jr.
Robert B. Steves
Arville T. Trostrud
By [signature]
Attorney INVENTORS
James E. Kinzie
John W. Pross, Jr.
Robert B. Steves
Arville T. Trostrud
By
Attorney 3,331,954

COMPUTER PERFORMING SERIAL ARITHMETIC OPERATIONS HAVING A PARALLEL-TYPE STATIC MEMORY

James E. Kinzie, John W. Pross, Jr., and Robert B. Steves, Vista, and Arville T. Trostrud, Encinitas, Calif., assignors to General Precision, Inc., a corporation of Delaware Filed Aug. 28, 1964, Ser. No. 392,708
5 Claims. (Cl. 235—156)

The present invention relates to electronic digital computers, and it relates more particularly to a high speed, general purpose digital computer of the type which is particularly adapted for use in airborne vehicles.

The computer to be described is of the same general type as described and claimed in copending application Ser. No. 392,681, filed Aug. 28, 1964, in the name of Kinzie et al.

The general purpose computer of the invention is capable, for example, of carrying out serial arithmetic processing at rates up to five megacycles. This is achieved by means of a static register and a pair of circulating registers, in conjunction with a parallel-type static memory.

That is, in the computer of the invention, a static register is utilized to convert parallel memory information into serial arithmetic operations, and all arithmetic processing is performed by the static register and the two circulating registers.

A feature of the computer of the invention is the provision of means for preserving a carry during double length operations, so that the computer may exhibit double length capabilities without the need for extraneous registers.

Another feature of the invention is the provision of means for carrying out multiplication operations by the stimultaneous processing of two multiplier bits, so as to cut the time required for such operations to essentially fifty percent of the time required by similar prior art computers.

Yet another feature of the invention is the provision of such a computer which is constructed to permit direct access to the memory thereof during operation of the computer, and often without disturbing the normal operation of the computer.

A still further feature is the provision of such a computer which is constructed to permit its normal program to be interrupted, so as to direct the computer to the execution of a more important program at any particular time, and which will permit the computer to return to its original program without loss of information, after the more important program has been completed.

The computer is also capable of performing certain shift operations in a fraction of the time required by the prior art computers of the same general type.

Other objects, features and advantages of the improved computer of the present invention will become evident from a consideration of the following description, when the description is considered in conjunction with the accompanying drawings, in which:

FIGURE 4 is a schematic logic diagram of a three-input adder which is included in the system to be described;

FIGURES 8A–8D are schematic operations of the different steps of a multiplication operation;

FIGURES 9A–9C are tables useful in explaining the multiplication operation;

FIGURES 11A, 11B, 12, 13, 14 and 15 represent certain shift operation;

The system to be described utilizes delay flip-flop circuits which have a single input. The state of any particular flip-flop is determined by the state of its input logic, when clocked. The flip-flop circuits also contain clock allow (C.A.) logic, which is capable of selectively inhibiting the clock so as to maintain the flip-flop in its previously set or reset state. The C.A. logic is omitted in the following logic equations, unless it can be set to the "zero" state.

Figure 1:
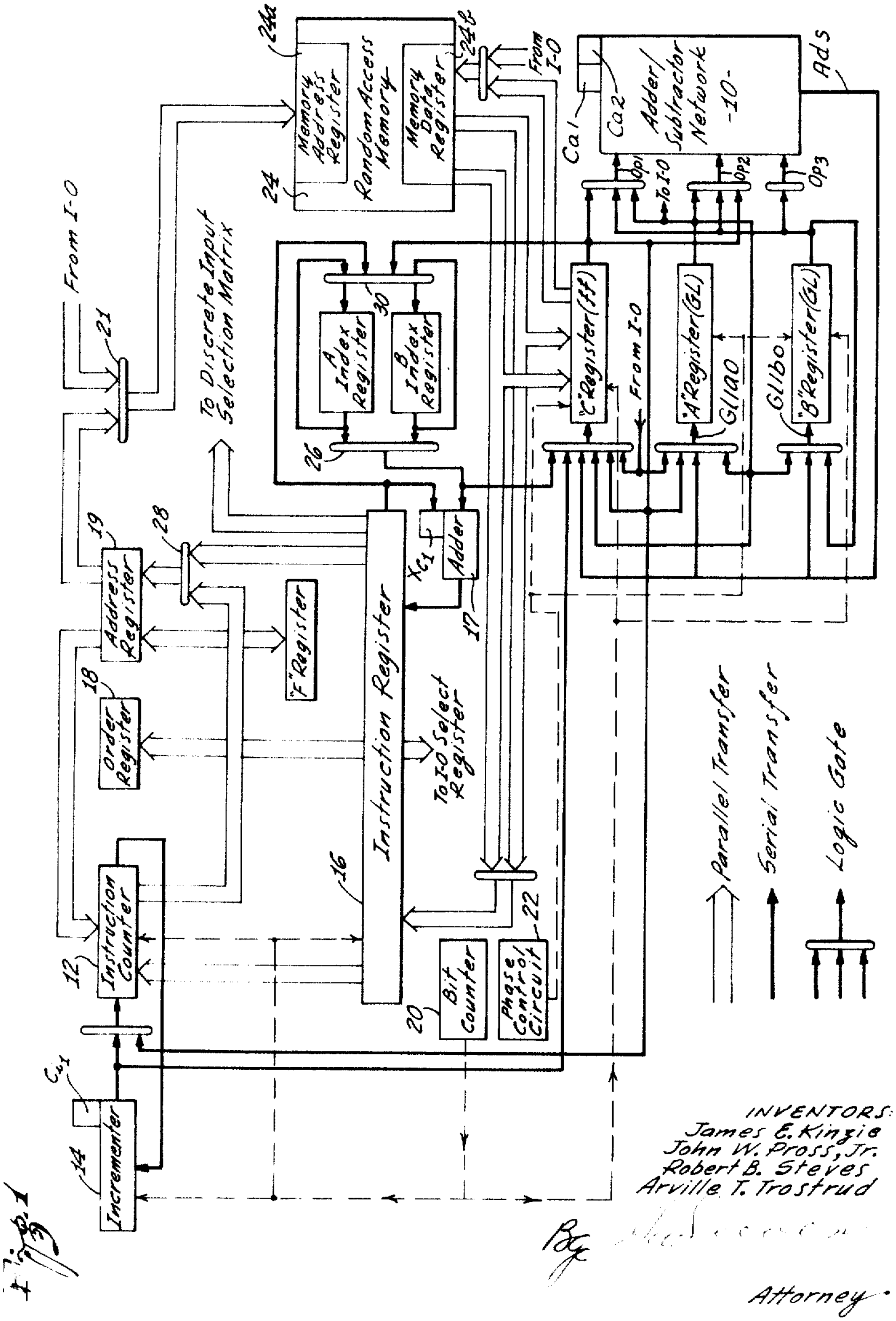
FIGURE 1 is a block diagram of an improved electronic digital computer, similar to the computer described and claimed in the aforesaid copending application, and incorporating the improved arithmetic section of the present invention.

As described in the copending application, the computer of FIGURE 1 is particularly constructed to meet the requirements of aircraft and space vehicle guidance systems. However, it will become evident as the description proceeds that the computer has general utility wherever the capabilities of a general purpose computer are required.

The computer of FIGURE 1 includes, as is usual in general purpose digital computers, a memory section, a control section, and arithmetic section, and an input-output section.

As mentioned above, the present application is particularly concerned with the arithmetic processing section. The aforesaid copending application Ser. No. 392,681 describes and claims the control section of the computer; and copending application Ser. No. 385,280, filed July 27, 1964, in the name of Kinzie et al., describes and claims the input-output section.

The computer of FIGURE 1 is constructed so that the control section and arithmetic processing section can operate in conjunction with a wide variety of different memory sections. However, in the embodiment to be described, the memory is a parallel-type random access core memory, such as described in the copending application Ser. No. 392,681. The memory may contain, for example, up to 16,380 words of various types of random access parallel storage.

As shown in FIGURE 1, and as mentioned above, the arithmetic processing section of the computer includes three registers. These registers are designated A, B and C respectively. The section also includes a three-input adder-subtractor network 10, and appropriate logic circuitry coupling the aforesaid registers to the adder. Since the arithmetic section operates in a serial manner in conjunction with a parallel memory, the C register is used as a buffer to convert the parallel memory information into serial information for arithmetic processing.

Figure 16:
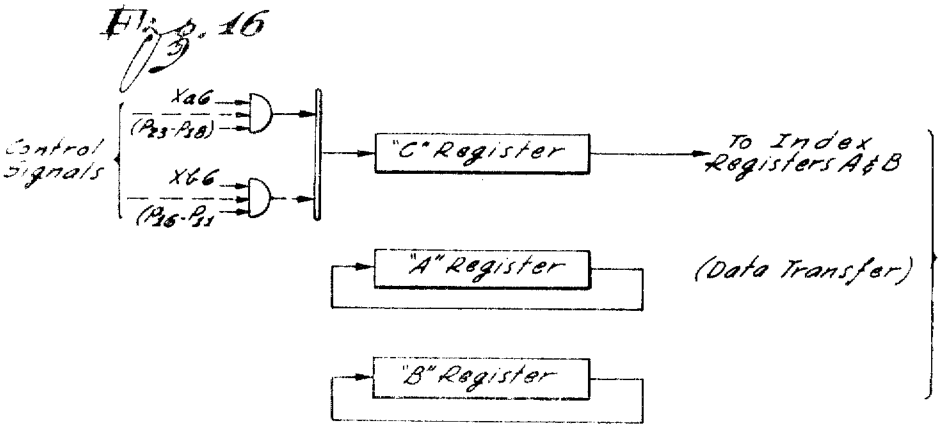
FIGURE 16 is a schematic representation of a data transfer operation.

It should be pointed out at this point that the use of a flip-flop type of shift register as a buffer to convert parallel information into serial information, and vice versa, is per se known. For example, the use of a flip-flop shift register as a buffer for transforming digital information from a parallel representation to a serial representation, and vice versa, is described in Section 16.16 and illustrated in FIGURE 16.18 of the Computer Handbook, Huskey and Korn, McGraw-Hill, first edition, 1962. Also, three-input adder-subtractor networks are, likewise, well known, such networks being described, for example, in the McGraw-Hill publication (1959) entitled "McGraw-Hill Service in Information Processing and Computers" by Samuel B. Williams (pages 166 and 167, FIGURES VII–8 and VII–9). Three-input adders are also shown and described in FIGURES 13–17 on page 286 of High Speed Computing Devices, Engineering Research Associates, W. W. Stifler, Jr. (editor) (1950); and in Logical Design of Digital Computers, by Montgomery Phister (pages 255, 256) of John Wiley & Sons, Inc. (1961). However, the particular three-input adder-subtractor network 10 to be described herein is particularly constructed and connected so as to perform the various operations required by the arithmetic operations to be performed, and its actual connections and composition will become evident from a consideration of its logic equations to be treated specifically in the following specification.

The A and B registers are of the high speed, dynamic circulating type, and they may incorporate appropriate zero temperature coefficient glass delay lines. Many types of such delay lines are presently on the market, and are available commercially. The C register, on the other hand, is a static shift type, and it may be formed of a plurality of flip-flops, as mentioned above.

As mentioned in the copending application Ser. No. 392,681, the flip-flops of the various registers in the computer, and in the other computer circuits, may be constituted by integrated circuit components, such as current mode silicon micro-circuits. By the use of such elements, the computer may be constructed to be, as desired, small in size, low in weight, exhibiting low power consumption, and having a high reliability.

In the ensuing description, the A register of the arithmetic processing section will sometimes be referred to as the "upper accumulator," and the B register will sometimes be referred to as the "lower accumulator."

The arithmetic operations are performed serially by the system on fixed point fractional numbers. The arithmetic processing is either twenty-eight bit for precision processing, or fifty-six bit for double precision processing, as will be described.

Negative numbers are represented by the two's complement technique. The A, B and C registers are full word twenty-eight bit registers. The A register (upper accumulator) contains the most significant twenty-eight bits of a fifty-six bit result from double length operations; and the B register (lower accumulator) contains the least significant twenty-eight bits.

The results from most arithmetic operations are held in the C register. This latter register provides the communication link between the arithmetic section and the memory, control and input-output sections of the computer. The C register, as mentioned, is a static shift register, and it is capable of both serial and parallel operations.

The three-input adder 10 is implemented with three inputs, so that multiplication may process two multiplier bits per word time. These multiplier bits are derived from the B register.

The C register also permits a one word length shift command to be executed in one word time regardless of the number of bit positions shifted. This is the "fast" shift, and it takes place in the C register. The shift is made through a selected number of bit positions in a first word time, and the shifted information is placed in the A register during a second word time.

"Long" shifts are also provided to operate on a double length number formed by the combined A and B registers. The long shift requires one word time per bit position shifted. That is, for the long shift, the information in both the A and B register is shifted as one long register, thus providing flexibility when mathematical necessity requires shifting double length words.

The computer of FIGURE 1 uses the single address sequential instruction format. That is, the different instruction words are stored in the memory at sequential address locations. An appropriate instruction counter 12, as described in the copending application Ser. No. 392,681, selects each instruction word in sequence, as successive instructions are executed. Each instruction establishes a different computer operation, and these instructions, for example, as will be described in detail subsequently herein include the following: "Load A Register" (LDA); "Load B Register" (LDB); "Add Upper Accumulator (ADU); "Add Lower Accumulator" (ADL); "Subtract Upper Accumulator" (SBU); "Subtract Lower Accumulator" (SBL); "Extract" (EXT); "Store C" (STC); "Multiplication" (MUL); "Division" (DVD); "Fast Right Shift" (FRS); "Fast Left Shift" (FLS); "Fast Shift" (FOS); "Shift" (OOS); "Long Right Shift" (LRS); "Long Left Shift" (LSS); "Long Shift" (LOS); "Data Transfer Operation" (DAT); "Return Address Operation" (RTA); "Branch 2" (BR2); "Input/Output" (INO).

Figure 2:
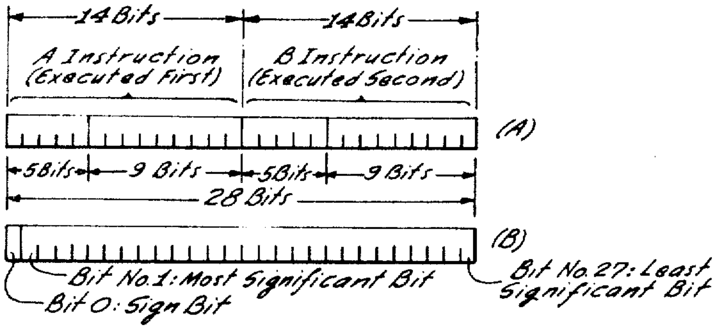
FIGURE 2 is a schematic representation of the composition of the words used in the computer shown in FIGURE 1.

Most instructions, as shown in FIGURE 2A, and as described in copending application Ser. No. 392,681 are coded as fourteen bits so as to allow the storage in the memory of two instructions for each twenty-eight bit computer word. As shown, nine bits of each instruction of FIGURE 2A are devoted to the address of the operand to be operated upon, and five bits are devoted to the operation code for the order to be performed.

The computer word shown in FIGURE 2B is a typical operand, with the most significant bit being at the left of the information portion of the word. The left hand, or zero bit is the sign bit, in accordance with usual computer practice.

The control section of the computer of FIGURE 1, as described in the copending application Ser. No. 392,681, includes the instruction counter 12, as mentioned above, and an incrementer 14. The instruction counter 12 steps from one count to the next after each instruction word is executed, so that the next instruction word in the sequence may be addressed and selected from the memory. The instruction counter 12 counts by circulating serially through the incrementer 14.

The control section of the computer also includes an instruction register 16. The instruction register receives instructions as they are read out of the memory, and it holds the B instruction (FIGURE 2A) while the A instruction is being executed. An adder 17 is included in the circuit of the instruction register 16.

The control section of the computer of FIGURE 1 also includes a pair of index registers A and B. The index registers may be decremented on programmed commands, as explained in the copending application Ser. No. 392,681. A selection gate 26 is included in the circuit of the index registers.

The control section also includes an order register 18 and an address register 19. The order register holds the operation code during the execution of an instruction, and the address register holds the address portion of the instruction during execution.

A bit counter 20 is included in the control section of the computer. In the particular embodiment the bit counter steps through a count of twenty-eight, and selected configurations of the counter are decoded to provide required distinctive bit timing pulses during each word time.

The control section also includes a phase control circuit 22. This circuit establishes the different operational phases of the computer. The phase control circuit 22 is described in detail in copending application Ser. No. 392,681, filed Aug. 28, 1964. Moreover, the phase control circuit described, for example, in Patent 3,074,638, Bible et al., which issued Jan. 22, 1963. A functional representation of the phase control circuit is shown in FIGURE 32 of the Bible patent. As described in the patent, the phase control circuit may include three flip-flops K1, K2 and K3. These flip-flops are controlled during the execution of any arithmetic operation, for example, so as to produce various terms which establish the different operational phases of the computer. For example, the different flip-flop configurations in the phase control circuit 22 provide respective one-word time terms signifying respectively a first word phase (F*w*), each additional word phase (A*w*), a read-in phase (IR), a last word phase (L*w*), and a hold phase (H*o*). The connection of the phase control circuit 22 to the other components of the computer will become apparent from the logic equations which are set forth in the specification, and in which the various phase terms (F*w*), (A*w*), (IR), (H*o*), (L*w*) appear.

An F register is included in the control section, which is used to augment the nine bit operand addresses which are explicitly coded in each instruction (FIGURE 2A). The F register permits a vast number of memory locations to be addressed with only nine bits in the address field of each instruction (FIGURE 2A). The operation of F register is described in detail in the copending application Ser. No. 392,681.

The memory section of the computer includes, for example, a random access, parallel core memory 24. The memory may contain a plurality of words of random access parallel storage. The memory includes a memory address register **24*a*, and a memory data register 24*b***.

To allow complete memory access, a flip-flop provides conditional control of the use of the F register to augment the operand addresses. The flip-flop may be set or reset by a programmed command. When the flip-flop is set, all operand addresses in the memory are augmented by the F register. When the flip-flop is reset, the F register augments only those operand addresses whose most significant bit is 1.

The memory 24 includes its own address register **24*a* and its own data input-output register 24*b*, as mentioned above. The memory also includes its own power, control and timing systems. Only two control signals are sent into the memory 24**. One of the control signals indicates whether to read out of memory or to store data in memory, and the other signal control the initiation of a memory cycle.

The memory system 24 may be addressed through an "or" gate 21, either by the address register 19 in the control section, or by the input-output section of the computer. Data may be derived from the C register in the arithmetic section, or from input-output section.

The arithmetic section of the computer operates serially on whole numbers to form whole number solutions. In addition to performing pure arithmetic operations, and as mentioned above, the arithmetic section also performs other operations (to be described), such as, shifting, masking, and data transfer.

Each of the A, B and C registers is a one-word register. The C register is a static shift register composed of twenty-eight flip-flops; and the A and B registers are dynamic circulating registers formed, for example, twenty-six glass lines, extended by flip-flops.

The circulating A register, as noted, serves as the main, or upper, accumulator; the circulating B register serves as the lower accumulator; and the static C register is capable of serial or parallel operation, and it acts as a memory buffer.

Figure 3:
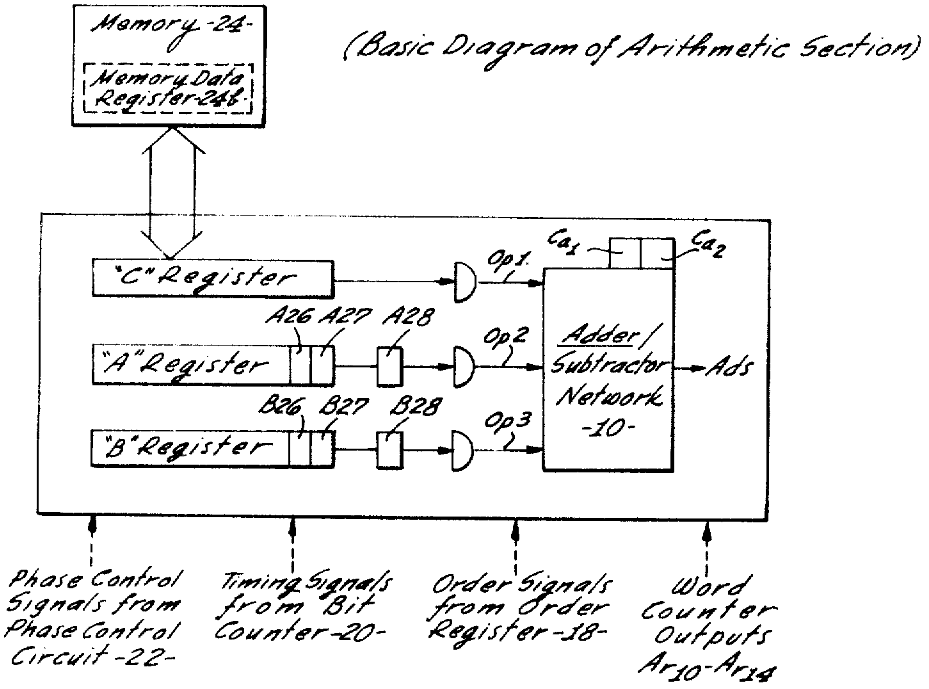
FIGURE 3 is a block diagram representing the basic components of the system of the invention.

Inputs to three-input adder-subtractor network 10 are controlled by three selection networks designated *op*1, *op*2 and *op*3 in FIGURE 3. The output from the network 10 is designated A*ds*. The carry flip-flops are C*a*1 and C*a*2, the C*a*2 flip-flop being more significant. The routing of the adder inputs and outputs is directed by order, phase and timing signals from the control section.

The static C register is composed of twenty-eight flip-flops, designated C0–C27. The least significant bit is represented by the flip-flops C27. As noted, the C register serves as a buffer between the memory 24 and the adder 10. This register accepts a word in parallel from memory and feeds the word serially into the adder.

Conversely, the C register receives a word in serial form from the adder 10, and introduces the word in parallel to the memory 24. The C register is also used in data transfer operations, and in some arithmetic operations, as will be described.

The timing of the C register, and of the A and B registers, is such that at P27 bit time; the flip-flop C0 in the C register holds the sign bit, the flip-flop C27 holds the least significant bit, and so on.

Figures 4, 8D:
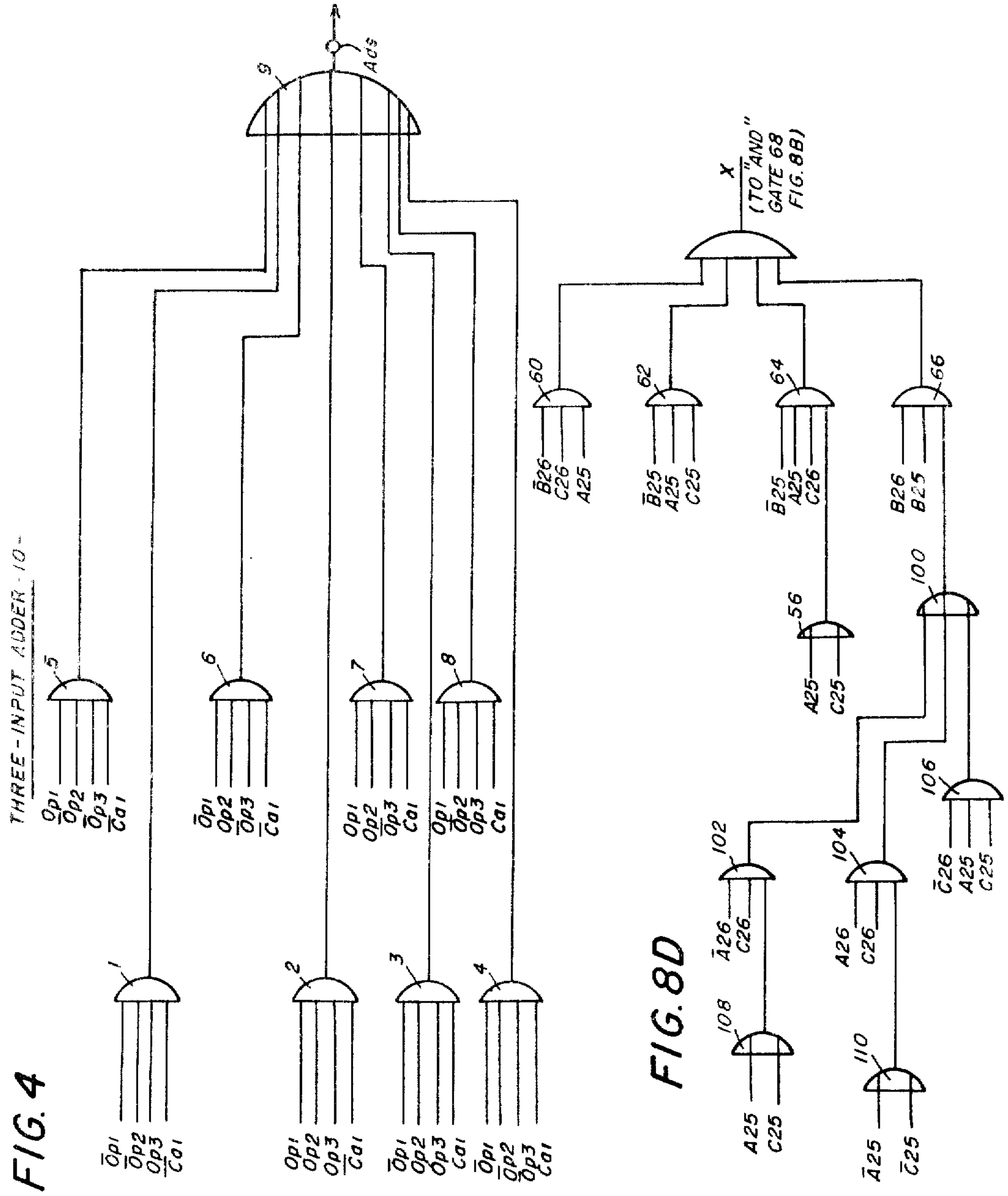
Figure 4A:
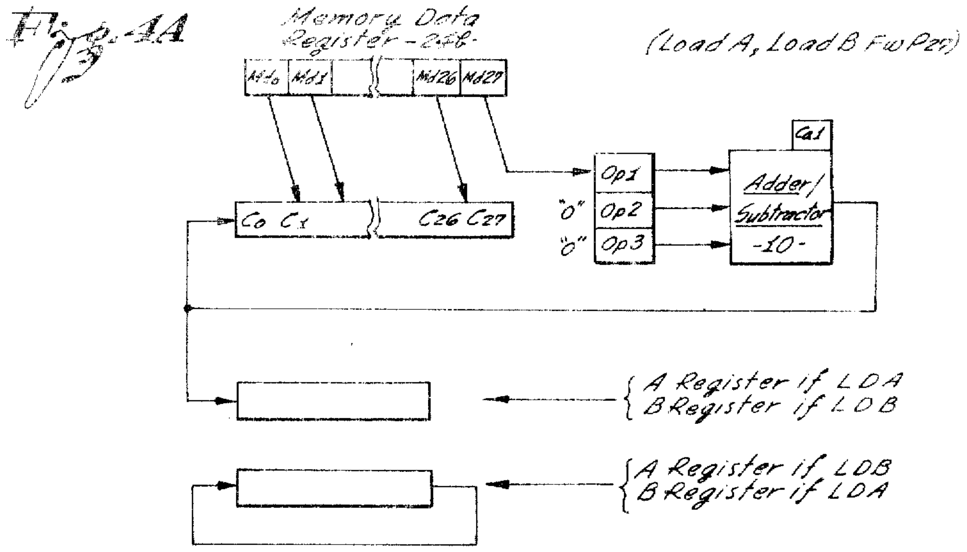
FIGURES 4A and 4B are schematic representations of certain loading operations.

For those operations requiring an operand from memory, the contents of the memory data register **24*b*** are transferred in parallel at P27 bit time to the C register (FIGURE 4A). In order to maintain the proper relationship between the A, B and C registers, the parallel transfer to the C register must include a one bit right shift. Therefore, the sign bit (M*d*0) is shifted into the flip-flop C1, the most significant bit (M*d*1) is shifted into the flip-flop C2; and so on. The least significant bit (M*d*27) is routed directly into the adder 10.

The control circuitry associated with the C register is operative at all times, except that it is disabled during Instruction read-in phase (IR), and during the first word time (F1) of a store operations, and during a part of the first word time (F*w*) of a fast shift operation.

As mentioned above, both the dynamic circulating A and B registers may, for example, be one word glass delay lines. Each line is twenty-six bits in length. The inputs to the lines are designated $glia_0$ and $glib_0$ respectively. The outputs of the lines are designated A25 and B25 respectively.

Extension flip-flops are provided for internal access to the circulating A and B registers. These are flip-flops A26, A27 and A28 for the A register; and B26, B27 and B28 for the B register. At P27 bit time, the least significant bits of the words in the A and B registers are in the flip-flops A27 and B27 respectively.

As mentioned previously, the A register serves primarily as the upper accumulator, and the B register serves as the lower accumulator. Other specialized uses for these registers will be described subsequently.

The three input adder 10 consists of a gating circuit of three terms, namely, O*p*1, O*p*2, O*p*3 and C*a*1 (C*a*1 represents the least significant carry flip-flop). When an odd number of these terms are true, the output A*ds* of the adder 10 is true. The most significant carry, C*a*2, does not appear in the equation for A*ds*, its state being a factor in the equation for C*a*1.

$$\begin{aligned}Ads = {} & Op1.\overline{Op2}.\overline{Op3}.\overline{Ca1}+\overline{Op1}.\overline{Op2}.Op3.\overline{Ca1}\\ & +\overline{Op1}.Op2.\overline{Op3}.\overline{Ca1}+Op1.Op2.Op3.\overline{Ca1}\\ & +Op1.Op2.\overline{Op3}.Ca1+\overline{Op1}.Op2.Op3.CA1\\ & +Op1.\overline{Op2}.Op3.Ca1+\overline{Op1}.\overline{Op2}.\overline{Op3}.Ca1\end{aligned}$$

The three-input adder 10 is shown schematically in FIGURE 4. The adder includes, as shown, a group of eight "and" gates 1–8 to which the terms in the above equation are applied; the "and" gates all being connected to an "or" gate 9.

The carry logic, of course, depends on the operation being performed at any particular time, and it will be discussed subsequently in conjunction with specific operations. A general rule, however, is that the three inputs to the adder 10 are used simultaneously only in the multiplication operation. Therefore, the flip-flop C*a*2 can be true only during the multiplication operation.

The first operation to be considered is the loading of the upper accumulator. This operation is designated "Load A" (LDA). The Load A operation requires one word time. This operation (LDA), places a selected operand in the A register and in the C register. The contents of the B register recirculate unchanged.

Figure 4B:
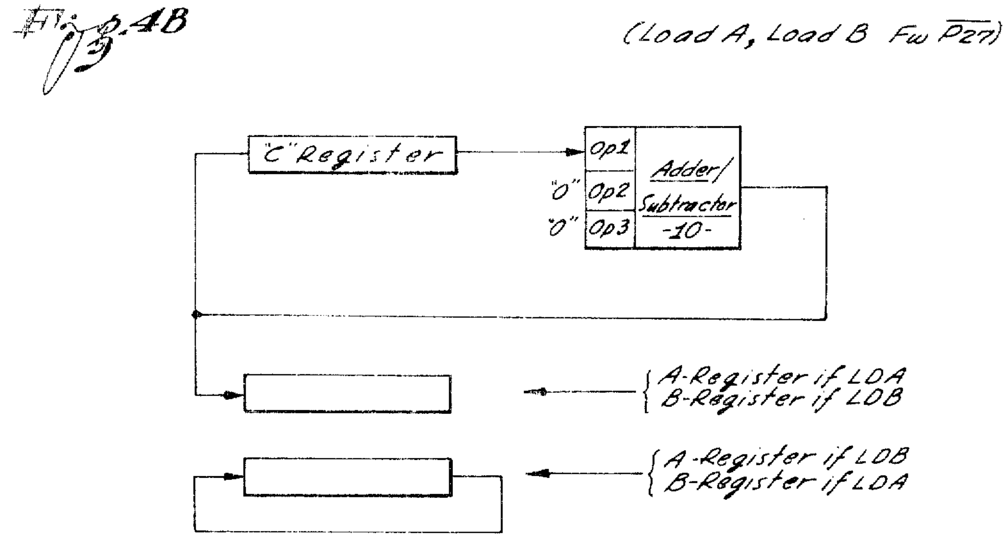

At P27 bit time of the first words (F*w*) phase of the (LDA) operation, and as shown in FIGURE 4A, the states of the flip-flops $Md0=Md26$ of the memory data register **24*b*** are transferred to the flip-flops C1–C27 of the C register, while the state of the flip-flop M*d*27 of the memory data register is transferred through the adder 10 to the flip-flop C0 of the C register and to the input ($glia_0$) of the A register. Of the three adder inputs, only O*p*1 can be true. Therefore, the carry flip-flop C*a*1, which is reset at the beginning of the operation, cannot be set. For the remainder of the word time (FIGURE 4B), the C register feeds the adder 10. The adder output A*ds* is directed onto the A and C registers, as shown in FIGURE 4B. The contents of the "B" register recirculate, as also shown in FIGURE 4B.

| | P27 | $\overline{P27}$ |
|---|---|---|
| $C_n$ | $Md_{n-1}LDAFwP27$ | $C_{n-1}\overline{P27}$( n=1-27) |
| $gOp_1$ | $Md_{27}LDAFwP27$ | $C_{27}LDAFw\overline{P27}$ |
| $gOp_2$ | 0 | 0 |
| $gOp_3$ | 0 | 0 |
| $Ca_1$ | 0 | 0 |
| $C_0$ | AdsFwLDA | ← |
| gliao | AdsFwLDA | ← |
| glibo | B27 $\overline{Aw}$ $\overline{Lw}$ $\overline{(ADL+SBL+LDB+MUL)}$ | ← |

The operation for loading the lower accumulator register is designated "Load B" (LDB). This operation takes one word time. For the (LDB) operation (FIGURES 4A and 4B), the selected operand is to be placed in the B register and in the C register. The contents of the A register recirculate unchanged for this operation.

The Load B operation is identical to the Load A operation, except for the inputs to the two registers A and B:

$$gliao=A27\ (\overline{ADU}+\overline{SBU}+\overline{LDA})\ (\overline{MUL}+\overline{INOH2}\ \overline{+FLS+EXT})$$

$$glibo=Ads.Fw.LDB$$

The "Add Upper" (ADU) operation is such that a selected operand is added to the contents of the A register. This operation requires one word time. The result of the operation is placed in both the A and C registers. The contents of the B register recirculate in unchanged form.

The method of transferring the selected operand from the memory data register **24*b*** to the C register is the same as for the Load A (LDA) operation described above.

Figure 5:
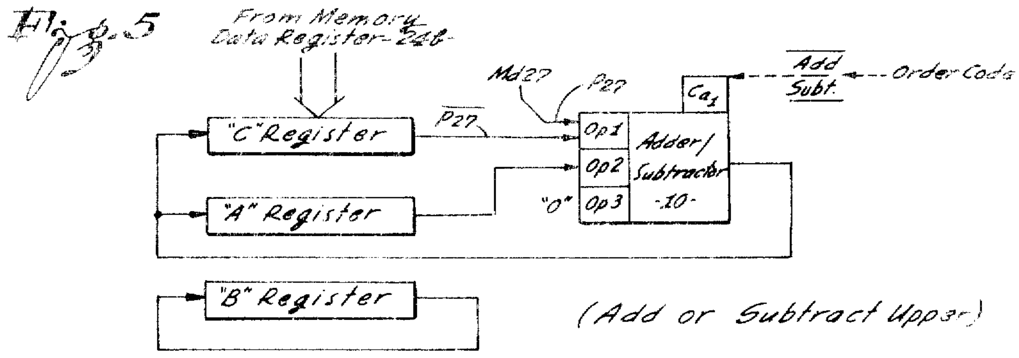
FIGURE 5 is a schematic representation of a first type of add or subtract operation.

Two inputs are fed to the adder 10 for the add upper (ADU) operation (FIGURE 5). The contents of the C register are fed through the gate O*p*1, and the contents of the A register are fed through the gate O*p*2.

The carry flip-flops C*a*1 is reset at the beginning of the (ADU) operation, and it will be set if both O*p*1 and O*p*2 are true. The carry flip-flop C*a*1 will then remain set until both the terms O*p*1 and O*p*2 are false. The $\overline{P0}$ term in the C*a*1 logic resets the carry flip-flop for the next operation.

$$gOp1=(Md27.P27+C27.\overline{P27})ADU$$

$$gOP2=A27.ADU$$

$$gOp3=0$$

$$Ca1=[Op2\overline{Op3}CA1+(Op1Op2\overline{Op3}+Op1\overline{Op3}Ca)\overline{SUB}\ \overline{MUL}\ \overline{DVD}]\overline{P0}\ \overline{Ca2}$$

$$C_0=Ads\overline{Or1}Or2$$

$$gliao=AdsFwADU$$

$$glibo=B27\ \overline{Aw}\ \overline{Lw}\ (\overline{ADL+SBL+LDB+MUL})$$

Figure 6:
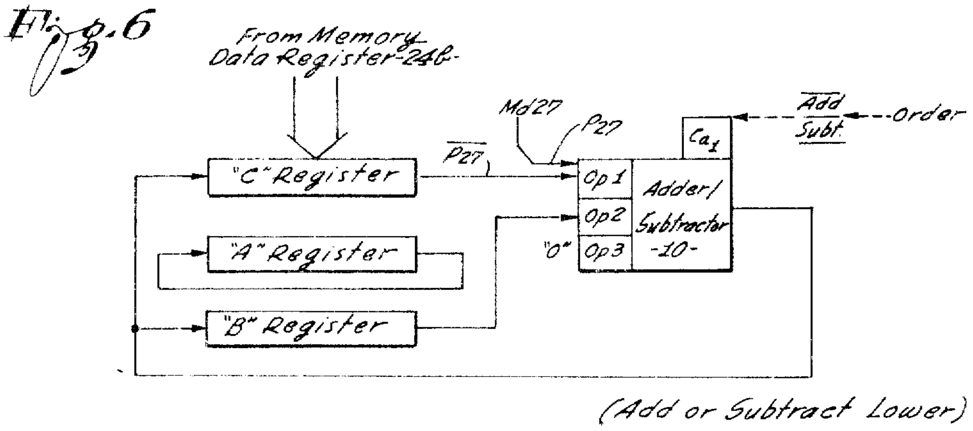
FIGURE 6 is a schematic representation of a second type of add or subtract operation.

The Add Lower (ADL) operation is shown schematically in FIGURE 6. This latter operation requires one word time. In carrying out the (ADL) operation, the selected operand is added to the contents of the B register, and the result is placed in both the B and C registers. The contents of the A register recirculate unchanged.

In carrying out the Add Lower (ADL) command, the selected operand is transferred from the memory data register **24*b* to the C register at P27 bit time (FIGURE 6), and it is shifted into the adder 10** through the gate O*p*1. The contents of the B register are fed to the adder 10 and through the gate O*p*2.

$$gOp1=(Md27P27+C27\overline{P27})ADL$$

$$gOp2=B27ADL$$

$$gOp3=0$$

$$Ca1=[Op2\overline{Op3}Ca1+(Op1Op2\overline{Op3}+Op1\overline{Op3}Ca1)\overline{SUB}\ \overline{MUL}\ \overline{DVD}]\overline{P0}\ \overline{Ca2}$$

$$C_0=Ads\overline{Or1}Or2$$

$$gliao=A27\ \overline{Fw(ADU+SBU+LDA)+Aw+Lw}\ (\overline{MUL+INOH2+FLS+EXT})$$

$$glibo=AdsFwADL$$

The arithmetic section is also capable of performing double length additions or subtractions. Double length additions are provided by following an Add Lower (ADL) operation with an Add Upper (ADU) operation. Any carry from the Add Lower operation is preserved, even in the presence of certain intervening operations, so as to permit the A, B and C registers to perform the double length operations.

The results of the double length addition or subtraction operations are placed in the A and B registers. This latter operation takes place in the manner explained, with the exception that a carry generated at P0 bit time of the Add Lower operation must be preserved, as noted, and applied at P27 bit time of the subsequent Add Upper operation.

Unless the programmer knows that an Add Lower operation will not overflow, the operation should be followed by an Add Upper to utilize the overflow. An intervening store C command (STC) may be programmed, without loss of the carry, to facilitate the storage of the double length result, storing the lower half while it is in the C register.

The carry is preserved during the double length addition and subtraction operation by use of a flip-flop C*v*. This flip-flop is set at P0 bit time by an Add Lower operation if a carry is generated. When the flip-flop C*v* is set, the carry flip-flop C*a*1 will be set at each P0 bit time. The flip-flop C*v* will remain set as long as the order code indicates an Add or Subtract Lower operation, or a Store operation, and the flip-flop C*a*1 is true at P27.

The order code will not change during a H*o* phase nor during the first part of an IR phase. Therefore, if a store operation, or an IR or H*o* phase follows an Add or Subtract Lower operation, the flip-flop C*a*1 will be true at P27 bit time, keeping the flip-flop C*v* in its set condition.

In order for the flip-flop C*v* to operate, the carry must be computed for the P0 bit during the lower operations:

$$Cv=Fw(ADL+SBL)P0+CvCa1(ADL+SBL+STC)+Cv\overline{P2}$$

$$Ca1=[\text{Normal carry logic}]\ [\overline{P0}+P0Fw(ADL+SBL)]+P0Cv$$

The Subtract Upper (SBU) operation is also shown schematically in FIGURE 5. This operation requires one word time.

For the Subtract Upper (SBU) operation, the contents of the upper accumulator (A) register are subtracted from the selected operand. The result is routed to the A and C registers. The contents of the B register recirculate unchanged.

The Subtract Upper (SBU) operation is the same as the Add Upper (ADU) operation, with the exception of the action of the carry flip-flop C*a*1. The carry flip-flop is set if the A register bit O*p*2 is a "1", and the C register bit Op1 is a "0." Once set, the flip-flop Ca1 remains set if the term Op2 equals 1 or Op1 equals 0.

$$gOp1=(Md27P27+C27\overline{P27})SBU$$
$$gOP2=A27SBU$$
$$GOp3=0$$
$$Ca1=[Op2CA1+SBU(\overline{Op1}Op2Op3+\overline{Op1}\overline{Op3}CA1]\overline{Ca2}\overline{P0}$$
$$C_0=AdsFw\overline{Or1}Or2$$
$$gliao=AdsFwSBU$$
$$glibo=B27\overline{AwLw}(\overline{ADL+SBL+LDB+MUL})$$

The Subtract Lower (SBL) operation is also shown schematically in FIGURE 6. For the Subtract Lower (SBL) operation, the contents of the B register are subtrated from the selected operand. The result is placed in the B and C registers. The A register contents recirculate unchanged. The carry must not be inhibited at P0 bit time.

The Subtract Lower (SBL) operation differs from the Subtract Upper (SBU) operation in the choice of the subtrahend, and the carry operation at P0 bit time.

$$gOp1=(Md27P27+C27\overline{P27})SBL$$
$$gOp2=B27SBL$$
$$gOp3=0$$
$$Ca1=[Op2Ca1+SUB(\overline{Op1}Op2\overline{Op3}+\overline{Op1}\overline{Op3}Ca1)][\overline{P0}+P0FwSBL]\overline{Ca2}$$
$$C0=AdsFw\overline{Or1}Or2$$
$$gliao=A27\overline{Fw(ADU+SBU+LDA)+Aw+Lw(MUL+1NOH2+FLS+EXT)}$$
$$glibo=AdsFwSBL$$

Figure 7:
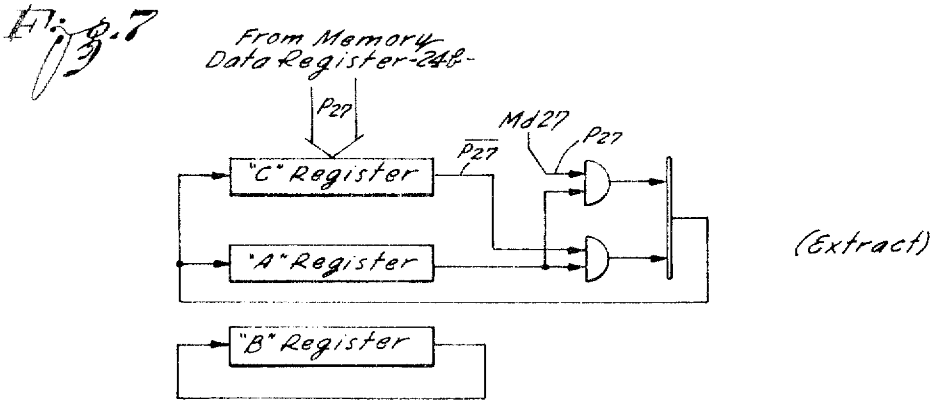
FIGURE 7 is a schematic operation of an "extract" operation.

The Extract (EXT) operation also requires one word time (FIGURE 7). In carrying out the Extract operation, a bit-by-bit logical product of the contents of the A register and the selected operand in the C register is formed. The result is placed back in the A and C registers. The contents of the B register recirculate unchanged. The Extract operation is shown schematically in FIGURE 7, and the operation may be expressed by the following logic equations:

$$C0=(Md27P27+C27\overline{P27})A27EXTFw$$
$$gliao=(Md27P27+C27\overline{P27})A27EXT\overline{AwLw}$$
$$glibo=B27\overline{AwLwADLSBLLDBMUL}$$

The Store C (STC) command is also executed in one word time. By this command, the contents of the C register are stored in the memory location indicated by the operand address. During the execution of the Store C command no change takes place in the contents of the A and B registers, and these registers are in their recirculate mode.

The initiate pulse for a Store Command (STC) in the A instruction (or in a B instruction when "Skip A" is specified) takes place during the Instruction Read (IR) phase. When the Store Command (STC) is in the B instruction, and "Skip A" is not specified, the initiate pulse occurs during the First Word Phase (F*wb*). The C register does not shift during the Store Command.

$$C.A.\text{ for }C_0\text{–}C_{27}=\overline{IRFwSTCF\phi S}$$
$$gliao=A27\overline{AwLwMULINOH2FLSEXT}$$
$$glibo=B27\overline{AwLwADLSBLLDBMUL}$$

The Multiplication (MUL) command requires fifteen word times. In executing this command, the selected operand is multiplied by the contents of the A register. A double length product is formed, with the lesser significant half placed in the B register and with the more significant half placed in both the A and C registers.

A fast multiplication operation is performed by the system of the invention by using two multiplier bits per word time. The C register holds the multiplicand, the B register holds the multiplier, and the A register holds the partial product.

Figures 8A, 8B:
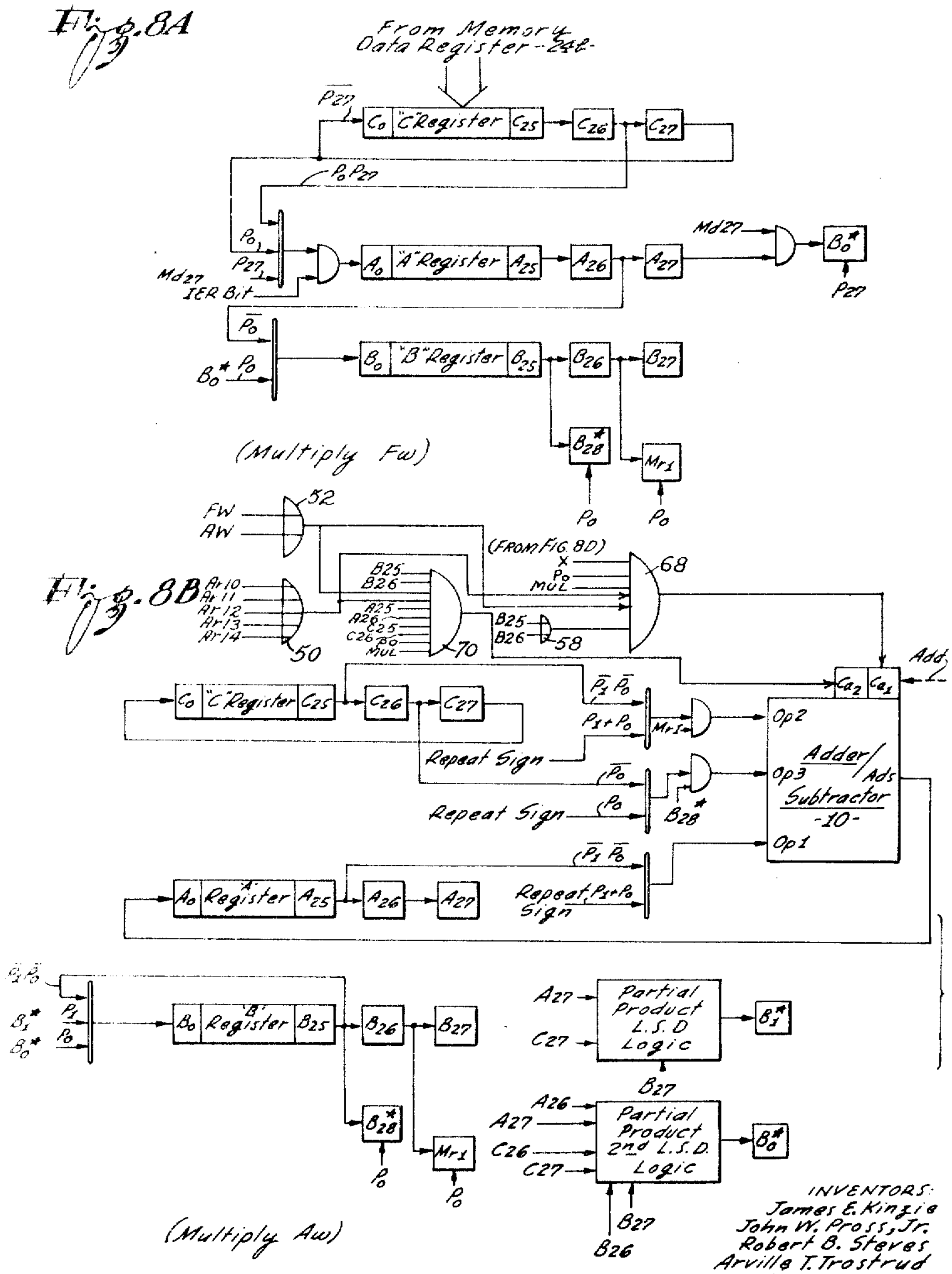
Figures 8C, 9A:
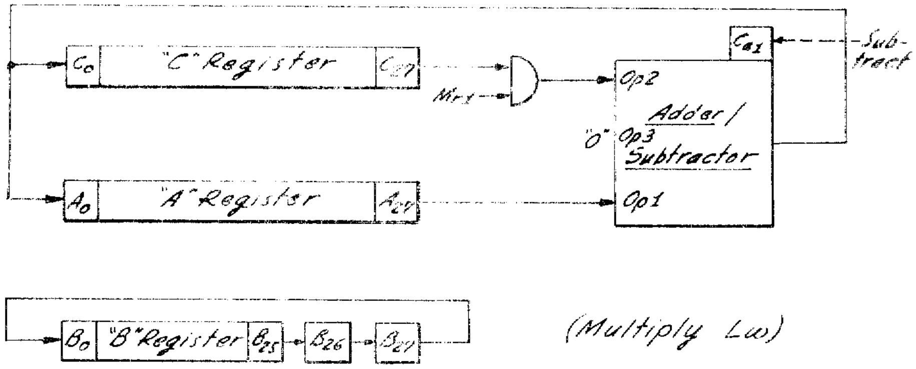

One multiplier bit is used during the first word phase (F*w*) (FIGURE 8A), and two are used during the thirteen additional word phases (A*w*) (FIGURE 8B). A sign correction takes place during the last word phase (L*w*) (FIGURE 8C). The multiplication (MUL) operation consists of successive additions of the multiplicand with the shifted partial product, under the control of the multiplier, beginning with the least significant multiplier bit. The three inputs to the adder 10, namely, O*p*1, O*p*2 and O*p*3 are used for this operation.

During the additional word phases (A*w*) and as shown in FIGURE 8B, two multiplicands, shifted one bit with respect to one another, make up two of the inputs to the adder 10. The third input is the partial product. Each additional word time of the additional word (A*w*) phase, the partial product is shifted two bits to the right. The two bits shifted out of the A register are transferred into the most significant bit end of the B register, taking the place of the used multiplier bits.

During the first word phase (F*w*) of the multiplication operation (*MUL.Fw*), and as shown in FIGURE 8A, the operand is transferred at P27 bit time from the memory data register 24*b* to the C register to become the multiplicand. The contents of the A register are shifted into the B register to become the multiplier.

The first multiplication operation takes place (FIGURE 8A) by shifting the contents of the C register into the A register, if the least multiplier bit M*r*1 is a "1." However, if the least multiplier bit M*r*1 is a "0," the A register is cleared. The C register is loaded, as in other arithmetic operations, except that the C0 flip-flop is loaded from the flip-flop M*d*27 in the memory data register 24*b*, rather than through the adder 10, as was the case in the "Load A" operation. The remainder of the word time, the contents of the C register recirculate.

Proper positioning of the multiplier is obtained by a one bit right shift, the B register copying A26 at $\overline{P0}$ bit times. The least significant bit of the product is computed by the flip-flop B0* and inserted into the B register at P0 bit time. The flip-flop B0* is set if the least significant bits of both operands are "1." The flip-flop M*r*1 checks the least multiplier bits in the flip-flop A26 at P0 bit time, the last bit time of the previous operation.

The flip-flop M*r*1 then controls the formation of the first partial product; routing the multiplicand to the A register if *Mr*1 equal 1, clearing the register if *Mr*1 equal 0. The multiplicand is right shifted as the input of the A register (*gliao*) reads the flip-flop C26 at $\overline{P27}.\overline{P0}$ bit times. The first bit is obtained directly from the memory data register 24*b*, since it is not in the C register at those bit times; and the sign is repeated by reading the flip-flop C27 at P0 bit time.

$$gOp1=0$$
$$gOp2=0$$
$$gOp3=0$$
$$C0=(Md27P27+C27\overline{P27})FwMUL$$
$$gliao=(Md26P27+C26\overline{P0}\,\overline{P27}+C27P0)FwMULMr1$$
$$glibo=(A26\overline{P0}+B0^*P0)FwMUL$$
$$Mr1=A26(\overline{MUL}+\overline{Fw}\,\overline{Aw})C.A.=\overline{P0}$$
$$B\bar{0}^*=A27Md27Fw\,C.A.=P27$$

The execution of the Multiplication operation during the additional words phase (A*w*) is shown schematically in FIGURE 8B. At P0 bit time of the First Word Phase (F*w*), and at P0 bit time of the Additional Word phase (A*w*), the two least significant bits of the unused multiplier bits are removed from the B register and stored in two flip-flops to control the addition of the multiplicand to the partial product. The term M*r*1 represents the less significant multiplier bit, and it controls the routing of the term C25 into the adder 10 through O$p$2.

The flip-flop B28* stores the more significant multiplier bit and controls the shifting of the flip-flop C26 into the adder 10 through the gate O$p$3. The gate O$p$1 directs the term A25, that is, the partial product, into the adder 10.

In each Additional Word phase (A$w$), the two least bits of the partial product are computed in special logic, rather than in the adder 10, and store, so as to be placed later into the two bit positions vacated by the used multiplier bits. The flip-flop $B1$* computes and stores the least significant bit of the new partial product in the B register. The computation takes place at P27 bit time. The logic orders the flip-flop B1* to set:

(a) When the least multiplier bit is "0" ($\overline{B27}$ at P27 bit time) if the least significant bit of the old partial duct is "1" (A27 at P27 bit time);

(b) When the least multiplier is "1" (B27 at P27 bit time) if the least significant bit of the old partial product is different from the least significant bit of the multiplicand ($A27.\overline{C27}+\overline{A27}.C27$ at $P27$ bit time).

The flip-flop B0* computes and stores the second least significant bit of the new partial product in the B register at P27 bit time by adding the second least significant bits of the old partial product (A26 at P27 bit time) and the less significant multiplicand (C26 at P27 bit time) to the least significant bit of the more significant multiplicand (C27 at P27 bit time), depending upon the appropriate multiplier bits (B26 and B27) the possible generation of a "carry" from the B1* computation must be accounted for ($A27.B27.C27$). The B0* calculation is illustrated in FIGURE 9A.

The adder 10 operates on the remaining bits of the partial product and the two multiplicands. The least bits of the partial product and the least multiplicand are accounted for in the flip-flops B1* and B0*, as is the least significant bit of the more significant multiplicand.

The adder inputs, therefore, are A25, C25 and C26, the latter two inputs being dependent upon the multiplier bits. The signs of the A25 and C25 inputs are extended by two bits, and the C26 input is extended by one bit. During the Additional Word Phase (A$w$), the C register recirculates, the A register copies the output of the adder 10 (A$ds$), and the B register shifts two bits to the right filling in with B1* and B0* at P1 and P0 bit times respectively (FIGURE 8B).

$$gOp1=(A25\overline{P1P0}+A26P1+A27P0)MULAw$$
$$gOp1=(C25\overline{P1P0}+C26P1+C27P0)Mr1MULAw$$
$$gOp3=(C26\overline{P0}+C26P0)B28^*MULAw$$
$$C0=C27\overline{LwFw}$$
$$gliao=AdsAw$$
$$glibo=(B25\overline{P1P0}+B1^*P1+B0^*P0)MULAw$$
$$Mr1=B26P0MULAw\ \ C.A.=P0$$
$$b28^*=B25MUL\ \ C.A.=P0$$
$$Mr1=B26P0MULAw\ \ C.A.=P0$$
$$b1^*=\overline{B27}A27+A27\overline{C27}+B27\overline{A27}C27\ \ C.A.=P27$$
$$\begin{aligned}b0^*=MULAw[&B27\overline{B26}(\overline{A27}+\overline{C27})\ (A26\overline{C26}+\overline{A26}C26)\\&+B27\overline{B26}A27C27(\overline{A26}\overline{C26}+\overline{A26}C26)\\&+B27B26(A27+\overline{C27})(A26\overline{C26}+\overline{A26}C26)\\&+B27B26\overline{A27}C27\overline{(A26\overline{C26}+\overline{A26}C26)}\\&+\overline{B27B26}A26\\&+\overline{B27}B26A26\overline{C27}+\overline{B27}B26\overline{A26}C27]\ \ C.A.=P27\end{aligned}$$

Since the two least significant bits of each partial product are computed independently of the adder 10, any carries which would result from the addition must be computed and fed to the carry flip-flops C$a$1 and C$a$2 at P0 bit time to be ready for first addition at P27 bit time.

The more significant carry flip-flop C$a$2 can be set only if both the multiplier bits are "1," and the two least significant bits of the partial product and multiplicand are "1." The two multiplier bits are in the flip-flops B25 and B26 at P0 bit time, the two least significant multiplicand bits are in the flip-flops C25 and C26, and the two least partial products bits are in the flip-flops A25 and A26.

The first calculation for C$a$2 is made at $Fw.P0$; additional calculations are made at P0 bit time of each Additional Word phase (A$w$) except the last. The last Additional Word phase is identified at P0 bit time by a zero code in the word counter.

The determination of the term C$a$1 at P0 bit time depends upon the same bits as does the term C$a$2, as shown in FIGURE 9B. FIGURE 9B illustrates the calculation which must take place and the truth table. As with the flip-flop C$a$2, the presetting of the flip-flop C$a$1 takes place at $Fw.P0$ and at P0 bit time of each Additional Word phase (A$w$) except the last.

$$\begin{aligned}Ca2=B25B26A25A26C25C26(&Ar10+Ar11+Ar12\\&+Ar13+Ar14)(Fw+Aw)P0MUL\end{aligned}$$

$$\begin{aligned}Ca1=P0MUL(Fw+Aw)(B25+B26)\{&\overline{B26}C26A25\\&+\overline{B25}A25C25+\overline{B25}A26C26(A25+C25)\\&+B26B25[\overline{A26}C26(A25+C25)+A26C26(\overline{A25}\\&+\overline{C25})+\overline{C26}A25C25]\}(Ar10+Ar11\\&+Ar12+Ar13+Ar14)\end{aligned}$$

The equivalent logic circuitry to control the flip-flops C$a$1 and C$a$2 for this operation is shown in FIGURES 8B and 8D and it includes, as shown, "and" gates 60, 62, 64, 66, 68, 70, 102, 104, 106; and "or" gates 50, 52, 54, 56, 58, 100, 108, 110.

During the remainder of the Additional Word phase (A$w$) the two carry flip-flops C$a$1 and C$a$2 function normally for a three input adder. The truth table for such an adder is shown in FIGURE 9C. In this three input adder, a situation causing both carries to be true simultaneously does not occur so it is not shown in the diagram.

$$\begin{aligned}Ca1=[&OP1\overline{Op2}Op3+Op2Op3\overline{Ca1}+\overline{Op1}Op3Ca1\\&+Op2Op3Ca1\\&+(Op1Op2\overline{Op3}+Op1\overline{Op3}Ca1)\overline{SUBLwDVD}]\\&\overline{Ca2P0}\\&+(Op1\overline{Op2}Op3+Op2Op3\overline{Ca1}+\overline{Op1}Op3Ca1\\&+Op1Op2\overline{Op3SUBLwDVD})Ca2\overline{P0}\end{aligned}$$

$$\begin{aligned}Ca2=[&Op1\overline{Op2}Op3+Op2Op3\overline{Ca1}+\overline{Op1}Op3Ca1\\&+Op2\overline{Op3}Ca1+(Op1Op2\overline{Op3}+Op1\overline{Op3}Ca1)\\&\overline{SUBLwDVD}]Ca2\overline{P0}+Op1Op2Op3Ca1\overline{P0}\end{aligned}$$

The Last Word phase ($MUL.Lw$) for the Multiplication operation is shown schematically in FIGURE 8C. If the sign bit for the multiplier is "1" (negative), as detected by M$r$1 at $P0.Aw$; the multiplicand must be subtracted from the last partial product to correct the result. The gate O$p$1 copies the last partial product in the A register; the gate O$p$2 copies the C register if M$r$1 is "1," otherwise supplying zeros to the adder. The carry is controlled for subtraction, O$p$2 being subtracted from O$p$1.

It will be recalled that the carries enter the Last Word Phase (L$w$) low, not being allowed to set at P0 of the last Additional Word Phase (A$w$). The output of the adder 10 representing the most significant twenty-eight bits of the products, is shifted into the A and C registers. The B register, containing the least twenty-seven bits of the product, recirculates during the Last Word Phase (L$w$). The sign bit of the multiplier remains in the last significant bit of the B register.

$$gOp1=A27MULLw$$
$$gOp2=C27MULMr1Lw$$
$$gOp3=0$$
$$Co=AdsLw$$
$$gliao=Ads\ Lw$$
$$glibo=B27\overline{Aw}MUL\overline{Fw}$$
$$\begin{aligned}Ca1=[&Op2\overline{Op3}Ca1+MULLw(\overline{Op1}Op2\overline{Op3}+\overline{Op1}\overline{Op3}\\&Ca1)]\overline{P0Ca2}\end{aligned}$$

The Division Operation (DVD) requires twenty-nine word times to execute. In carrying out the Division operation, the double-length word contained in the A register, extended by the B register, is divided by the selected operand.

A single-length quotient is formed, and at the conclusion of the Division operation, the quotient is located in both the A and C registers. Also, at the end of the division operation, the remainder is located in the B register.

In carrying out the Division (DVD) operation, a nonrestoring algorithm is used. The rule which is followed is:

(a) If the sign of the remainder and the sign of the divisior are the same, the divisor will be subtracted from the left-shifted remainder, and a "1" will be placed in the quotient.

(b) If the sign of the remainder and the sign of the divisor are not alike, then the divisor will be added to the left-shifted remainder, and a "0" will be placed in the quotient.

During the Division operation, the A and B registers hold the remainder, and the C register holds the divisor. The remainder shifts left one bit for each word time. The space vacated by the remainder, in each instance, is filled with the quotient bit. One quotient bit is formed at the end of the First Word (F$w$) phase; and at the end of each Additional Word (A$w$) Phase.

To complete the operation, the remainder is transferred to the B register, and the quotient is transferred to the A and C registers. It should be noted that the absolute value of the divisor must exceed that of the dividend.

Figure 10A:
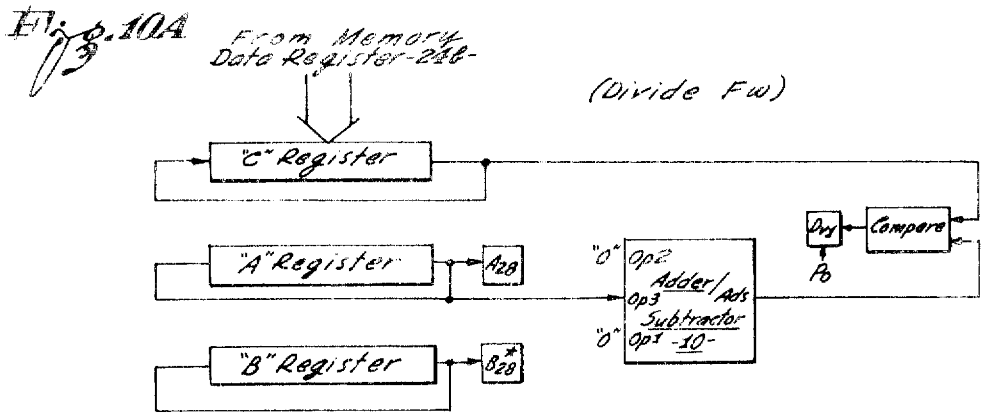
FIGURES 10A–10C are schematic representations of a division operation.
Figure 10B:
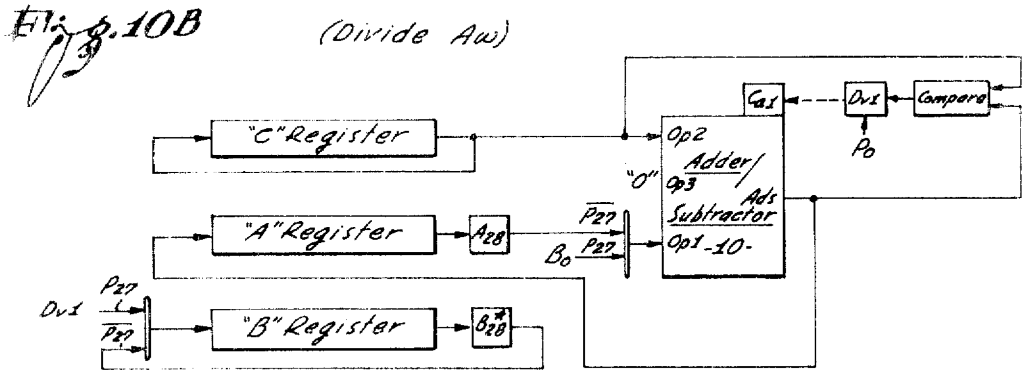

During the First Word Phase (F$w$) of the Division operation, and as shown in FIGURE 10A, the divisor is brought from the memory data register 24$b$ at P27 bit time and is placed in the C register. The A and B registers recirculate. The first sign comparison is made at P0 bit time. The sign of the divisor is in the flip-flop C27; the sign of the dividend comes from the output of the adder 10, the only input to the adder being A27.

Figure 11A:
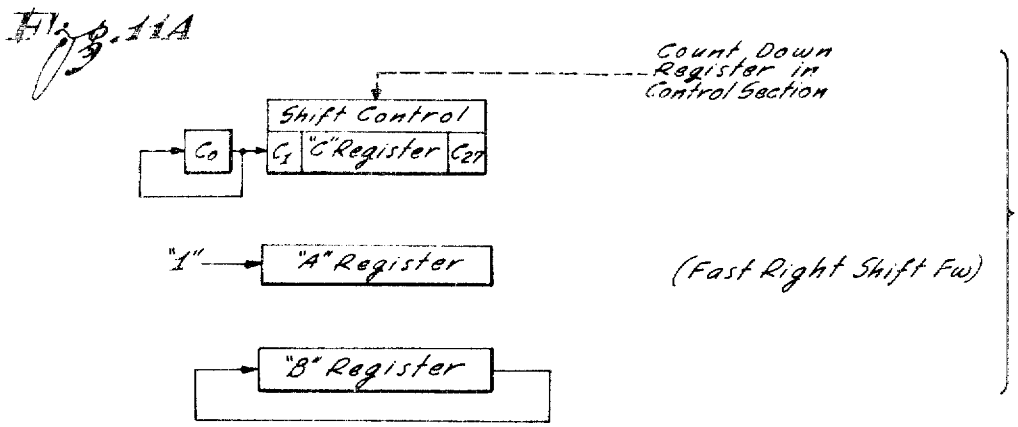
Figure 11B:
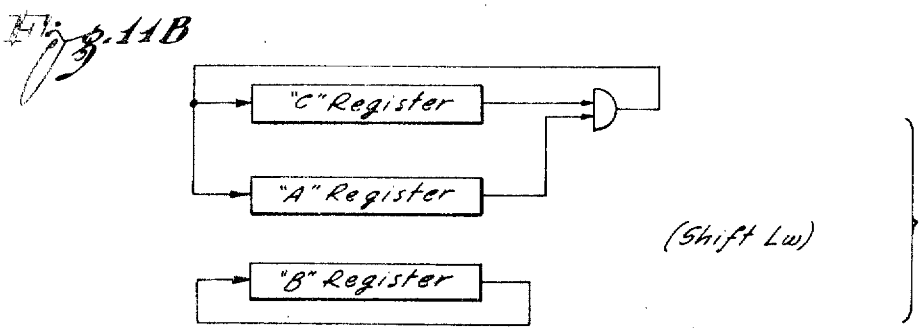

$gOp1=0$
$gOp2=0$
$gOp3=A27FwDVD$
$C0=(Md27P27+C27\overline{P27})FwDVD$
$gliao=A27\overline{ADUSBULDAAwLwMULINOH2FLSEXT}$
$b0=glibo=B27\overline{AwLw}(\overline{ADL}+\overline{SBL}+\overline{LDB}+\overline{MUL})$
$dv1=AdsC27+\overline{AdsC27}$ $C.A.=P0$
$b28^*=B27\overline{MUL}$
$a28=A27$ During the first word of the Additional Word Phase (A$w$), and as shown in FIGURE 11B, the operand in the C register is added to or subtracted from the left-shifted remainder in the A register on the basis of the sign comparison at $P0.Fw$.

The left shift of the remainder takes place by extending both the A and B registers with the flip-flops A28 and B28 respectively. The P27 bit for the O$p$1 input to the adder 10 comes from the flip-flop B0, the most significant bit of the B register. The P27 bit for the B register is the quotient bit D$v$1. At P0 bit time, a new quotient bit is determined, and the process is completed.

The carry operates under the control of the quotient bit. If D$v$1 is true, indicating that the signs are alike, the carry flip-flop C$a$1 functions for subtraction; otherwise addition takes place. The contents of the C register recirculate during this operation.

Figure 10C:
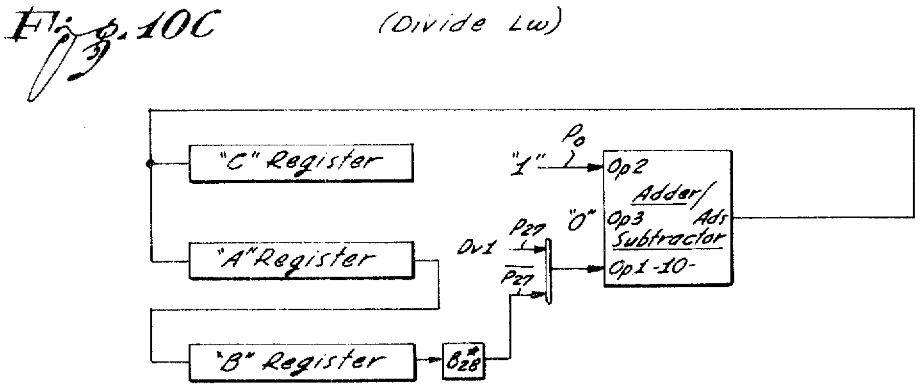

$gOp1=(B0P27+A28\overline{P27})DVDAw$
$gOp2=C27DVDAw$
$gOP3=0$
$C0=C27\overline{FwAw}$
$gliao=AdsAw$
$b0=glibo=(Dv1P27+B28^*\overline{P27})DVDAw$
$dv1=AdsC27+\overline{AdsC27}$ $C.A.=P0$
$b28^*=B27\overline{MUL}$ $a18=A27$
$Ca1=\{Op2\overline{Op3}Ca1+DVD[Dv1(\overline{Op1}Op2Op3+\overline{Op1}\overline{Op3}Ca1)+\overline{Dv1}\overline{SUB}\overline{MUL}(Op1Op2Op3+Op1\overline{Op3}Ca1)]\}\overline{Ca2P0}$ During the Last Word Phase (L$w$) of the Division operation, and as shown in FIGURE 10C, the last quotient bit is entered into the quotient word as it is transferred to the A and C registers through the adder (O$p$1). The quotient is left-shifted into the adder through B28*. The contents of the A register are shifted into the B register to preserve the remainder.

The division algorithm produces an error in the sign bit. This bit is reversed by inserting a "1" into the adder through O$p$2 at P0 bit time. The carry may function for add or subtract, during this operation, but the result will remain the same.

$gOp1=(Dv1P27+B28^*\overline{P27})DVDLw$
$gOp1=P0LwDVD$
$gOp3=0$
$C0=AdsLw$
$gliao=AdsLw$
$glibo=A27DVDLw$
$b28^*=B27\overline{MUL}$ The arithmetic section can also perform a Fast Right Shift operation (FRS). This latter operation requires two word times. The (FRS) operation is illustrated in FIGURES 11A and 11B.

In carrying out the Fast Right Shift (FRS) operation, the contents of the C register are shifted right the number of places indicated by the address portion of the instruction word. The result is placed in the A and C registers. The contents of the B register recirculate unchanged.

If a zero-place shift is programmed, the A register will copy the C register. The B and C registers will remain unaltered.

The phasing for the Fast Right Shift (FRS) operation is one first word phase (F$w$) (FIGURE 11A) followed by one last word phase (L$w$) (FIGURE 11B). During the first word phase (F$w$), the C register logic indicates a shift. The C register is activated as long as the word counter in the control section of the computer has a value other than zero. The counter counts down one count for each bit time in the first word phase (F$w$) until it is zero, at which time the C register ceases shifting.

For sign extension, the most significant bit in the C register (C0) copies itself. The A register copies ones. The A and C registers copy the "Anded" outputs of the same two registers during the last word phase (L$w$). The output of the "And" gate is effectively the contents of the C register, since the A register was filled with 1's during the first word time (F$w$).

$C0=C0FRSFw+A27C27\overline{Or2}Lw$
$C1=C0\,\overline{ADD}\,\overline{SUB}\,\overline{LDS}\,\overline{MUL}\,\overline{DVD}\,\overline{STC}\,\overline{EXT}\,\overline{RTA}$
C.A. for C Reg$+\overline{IRSTCFLS}(Ar10+Ar11+Ar12+Ar13+Ar14)$
$F\phi SFw+\overline{IRFw}$
$gliao=FwFRS+A27C27\overline{Or2}Lw$
$glibo=B27\overline{Aw\phi\phi SADLSBLLDBMUL}$ The Fast Left Shift operation (FLS) also requires two word times. The Fast Left Shift operation is illustrated schematically in FIGURES 12 and 11B. In carrying out this operation, the contents of the C register are shifted left the number of places indicated by the normal address portion of the word. The result is placed in the A and C registers. The contents of the B register do not change. If a zero-place shift is programmed, the A register will copy the C register. The B and C registers will be unaltered.

The phasing for the (FLS) operation is one First Word Phase (F$w$) (FIGURE 12) followed by one Last Word Phase (L$w$) (FIGURE 11B). During the First Word Phase (Fw) the C register logic indicates right shift (recirculation). The word counter in the control section, having previously been loaded begins to decrement by one count for each bit time, as in the Fast Right Shift operation. The C register is permitted to operate only in the First Word Phase (Fw) after the word counter value reaches zero. The absence of a right shift during the first part of the word constitutes an effective left shift.

Figure 12:
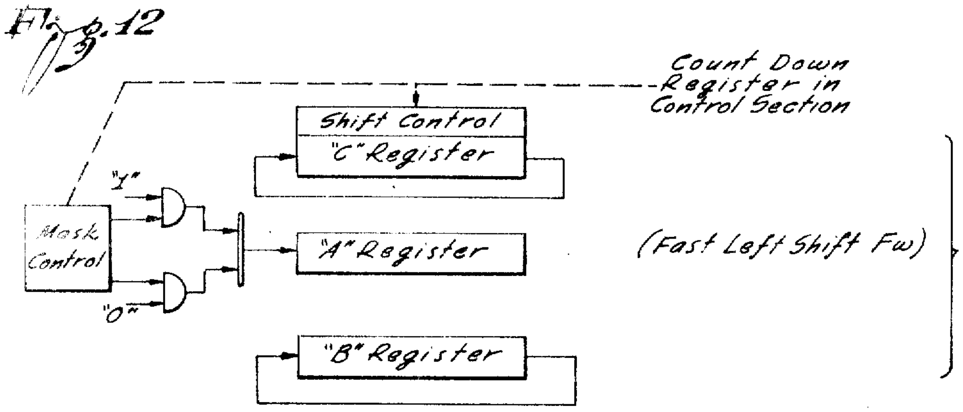

In a Left Shift operation the bit shifted to the least significant bit end of the word should be zeros. An unwanted side effect of the Fast Left Shift operation is to shift the more significant bits, which should have been discharded, into the less significant bit positions. To remove these bits, a mask is prepared in the A register during the First Word Phase (Fw) (FIGURE 12). A "1" is placed in the A register in those bit positions corresponding to the clock-allow signals to the C register. Durthe last word phase (Lw) the mask is applied to the output of the C register, as the output is routed to the A and C registers.

$C0=C27\overline{Lw}FLS+A27C27\overline{Ors}Lw$ $C1=Co\overline{ADDSBULDSMULDVDSTCEXTRTA}$ C.A. for C Reg.$=\overline{IRSTCFRSAr10Ar11Ar12Ar13Ar14}$ $+\overline{IRFw}$ $gliao=\overline{FLS}\overline{Ar10}\overline{Ar11}\overline{Ar12}\overline{Ar13}\overline{Ar14}Fw$ $+A27C27\overline{Or2}Lw$ $glibo=B27\overline{Aw}\phi\phi S\overline{ADLSBLLDBMUL}$ The Long Right Shift operation (LRS) is represented in FIGURE 13 for the First Word Phase (Fw), in FIGURE 14 for the Additional Word Phases (Aw) and in FIGURE 11B for the Last Word Phase (Lw). This operation is designated LRS, and it requires $M+2$ word times.

The double length word to be shifted during the Long Right Shift operation (LRS) is contained in the A and B registers, and it is shifted to the right a number of places indicated by the instruction word. That is, the contents of the A register shift into the B register with the sign extended into the A register.

The phasing of the Long Right Shift (LRS) operation proceeds from the First Word Phase (Fw) (FIGURE 13) to a number of Additional Word Phases (Aw) (FIGURE 14), and then to a Last Word Phase (Lw) (FIGURE 11B). The number of Additional Word Phases (Aw) is equal to the number of places shifted, and it is controlled by the word in the control section of the computer-counter. The word counter is preset by the (LRS) command. At the end of the operation the contents of the C register are equal to the contents of the A register.

If the five bits in the (LRS) instruction word indicating the number of places to shift are all zeros, a sixteen-place shift occurs.

During the First Word Phase of the (LRS) operation (FIGURE 13) the contents of the A and B registers recirculate, and the C register is loaded with ones. To perform the right shift, the contents of the A and B registers recirculate in a loop shortened by one bit during the Additional Word Phase (Aw) (FIGURE 14), copying A26 and B26, respectively.

At P0 bit time, the sign is extended in the A register, and the last significant bit from the A register (stored in B0*) is inserted in the most significant bit position of the B register.

The flip-flop B0* copies the least significant bit from the A register at each P27 bit time. The C register recirculates during the Additional Word Phases (Aw). The Last Word phase, as indicated in FIGURE 11B, is identical to the Last Word Phase for the fast shift operations.

| | Fw | Aw | Lw |
|---|---|---|---|
| C0 | Fw L$\phi$S | C27 $\overline{Lw}$ $\overline{Fw}$ | A27 C27 Lw $\overline{Or2}$ |
| gliao | A27 $\overline{ADU}$ $\overline{SBU}$ $\overline{LDA}$ $\overline{Aw}$ $\overline{Lw}$ $\overline{MUL}$ $\overline{INOH2}$ $\overline{FLS}$ $\overline{EXT}$ | (A26$\overline{P0}$+A27P0) LRS Aw | A27 C27 Lw $\overline{Or2}$ |
| glibo | B27 $\overline{Aw}$ $\overline{Lw}$ $\overline{ADL}$ $\overline{SBL}$ $\overline{LDB}$ $\overline{MUL}$ | (B26$\overline{P0}$+B0*P0) LRS Aw | B27 $\overline{Aw}$ $\phi\phi$S $\overline{Fw}$ |
| b0* | A27 LRS, CA=P27 | ← | ← |

The Long Left Shift (LLS) operation is represented in FIGURE 11B, FIGURE 13 and FIGURE 15. The Long Left Shift operation requires $M+2$ word times.

The double length number contained in the A and B registers is shifted to the left during the Long Left Shift operation to the number of places specified in the instruction word. That is, the contents of the B register shift into the A register. At the end of the operaion, the A and C registers contain the more significant bit portion of the shifted word; the B register contains the less significant bit portion. The phasing is the same as for the Long Right Shift (LRS) command.

The First Word Phase (Fw) of the Long Left Shift operation, as shown in FIGURE 13, is the same as for the Long Right Shift operation. During the Additional Word Phase (Aw) in carrying out the Long Left Shift operation, the contents of the A and B registers both shift left by recirculation in a loop with an extra bit of delay added (FIGURE 15). The added delay is the flip-flop A28 for the A register, and the B28* flip-flop for the B register. At P27 bit time, the most significant bit of the contents of the B register is inserted into the least significant bit position of the A register, and a zero is inserted into the last significant bit position of the B register.

During the Last Word Phase (Lw) of the Long Left Shift operation, as shown in FIGURE 11B, is the same as for the other shift commands. This is because the two bits which identify the four types of shift operations are contained in the address register in the control section. During the Last Word Phase (Lw), these bits are lost in setting up the address of the next operand or instruction.

| | Fw | Aw | Lw |
|---|---|---|---|
| C0 | Fw L$\phi$S | C27 $\overline{Lw}$ $\overline{Fw}$ | A27 C27 Lw $\overline{Or2}$ |
| gliao | A27 $\overline{ADU}$ $\overline{SBU}$ $\overline{LDA}$ $\overline{Aw}$ $\overline{Lw}$·$\overline{MUL}$ $\overline{INOH2}$ $\overline{FLS}$ $\overline{EXT}$ | (A28 $\overline{P27}$+B0P27) LLS Aw | A27 C27 Lw $\overline{Or2}$ |
| b0, glibo | B27 $\overline{Aw}$ $\overline{Lw}$ $\overline{ADL}$ $\overline{SBL}$ ·$\overline{LDB}$ $\overline{MUL}$ | B28* $\overline{P27}$ LLS Aw | B27 $\overline{AW}$ $\phi\phi$S $\overline{Fw}$ |
| a28 | A27 | ← | ← |
| b28* | B27 $\overline{MUL}$, CA=$\overline{MUL}$ | ← | ← |

The Data Transfer Operation (DAT) requires one word time. The operation is shown schematically in FIGURE 16. The Data Transfer Instruction contains four flag bits with the following meanings:

(a) Transfer Contents of Index Register A to the bit positions P23–P18 in the C register.
(b) Transfer contents of Index Register B to the bit positions P16–P11 in the C register.
(c) Transfer the information at bit positions P23–P18 of the C register to the Index Register A.
(d) Transfer the information at the bit positions P16–P11 of the C register to the Index Register B.

Any combination of the four possibilities may be effected by the placement of "1's" in the appropriate bit positions. During the Data Transfer operation the C register shifts right, and the A and B registers recirculate. The C register copies zeros except during P23–P18 bit times and P16–P11 bit times. During those times the C register copies one of the Index Registers A or B, if the applicable flag bit is true. If the flag bit is false, the C register copies zeros. If the flag bits for neither of the items (a) nor (b) are set, the C register will complete the operation by copying zeros. If neither of the items (c) nor (d) are indicated, the index registers will not change.

The flag bits are stored in the address register 29 in the control section. The following bits apply to the indicated operation.

1. A$r$6 Index A→C
2. A$r$7 Index B→C
3. A$r$8 C→Index A
4. A$r$9 C→Index B $$C0=[Xa6Ar6(P23\text{–}P28)+Xb6Ar7(P16\text{–}P11)]DATFw$$
$$gliao=A27\overline{AwLwADUSBULDAMULINOH2FLSEXT}$$
$$glibo=B27\overline{AwLwADLSBLLDBMUL}$$

Figure 17:
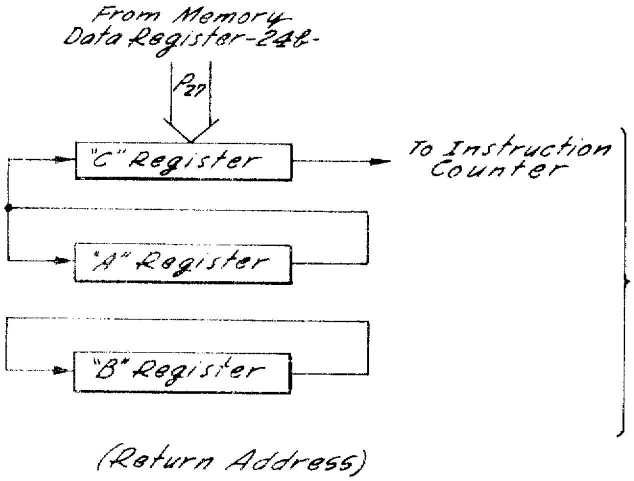
FIGURE 17 is a schematic representation of a "return address" operation.

The Return Address Operation (RTA) is shown in FIGURE 17. The only functions of the arithmetic section during this operation are to shift the addressed operand from the C register into the instruction counter 12, simultaneously shifting the contents of the A register into the C register. The A and B registers recirculate.

$$C0=A27RTAFw$$
$$gliao=A27\overline{AwLwMULINOH2FLSEXT}$$
$$glibo=B27\overline{AwLwADLSBLLDBMUL}$$

The "Branch 2" operation (BR2) requires two word times. The phasing for the operation is a First Word Phase (F$wa$) followed by a First Word Phase (F$wb$).

During (F$wa$) all the registers recirculate. During (F$wb$) if the branch condition is met, and the Return Address Flag I$r$8 in the instruction is "1," the C register copies the output of the instruction counter incrementer 14 so that it may be stored during the following instruction. If the branch condition is not met, or if the Flag Bit is "0," the C register contents recirculate.

If the branch is the result of a programmed interruption (which occurred during ExA, indicated by $Ab=1$), then a Flag bit will be set in the P27 bit position in the C register and stored along with the return address. The address occupies bit positions P16–P13.

The flip-flop C$m$1 will be false during the First Word Phase (F$wa$) allowing recirculation of the C register. The flip-flop C$i$1 is the carry flip-flop for the incrementer 14. The flip-flop A$b$2 cannot be true at $Fwa.P27$.

$$C0=[Ab2P27+C27(\overline{Ir8}+\overline{Cm1})+Ir8Cm1Si1(\overline{Ic14}+\overline{Ci1})(Ic14+Ci1)]BR2Fw$$
$$gliao=A27\overline{AwLwMULINOH2FLSEXT}$$
$$glibo=B27\overline{AwLwADLSBLLDBMUL}$$

$$si1=P27;\ \overline{Si1}=P13$$
$$cm1=Br2P0Fwa(\text{Branch Conditions})+Cm1\overline{P0}$$

The Input-Output operation (INO) requires one word time. During the execution of the input-output operation, both the A and C registers copy an input-output selection gate I$n$1, if a control signal H2 is true. Otherwise, the contents of the A and C registers recirculate. The B register does not change.

A full explanation of this command is found in copending application Ser. No. 385,280.

$$C0=In1INOH2Fw+C27\overline{Lw}INO\overline{H2}$$
$$gliao=In1INOH2Fw+A27\overline{AwLwADUSBULDAMULINOH2FLSEXT}$$
$$glibo=B27\overline{AwLwADLSBLLDBMUL}$$

The invention provides, therefore, an improved electronic digital computer which is capable of performing certain arithmetic and other operations in an improved, more rapid and simplified manner. The computer of the invention includes improved and unique circuitry and systems for achieving the desired operations.

It is to be understood that although a particular embodiment of the invention has been shown and described, modifications may be made. The following claims are intended to cover the modifications which fall within the scope of the invention.

What is claimed is:

1. A digital computer including: a parallel-type memory for storing binary signals representative of a plurality of operands; a shift buffer register having intermediate access points at each bit position therein; first logic circuitry coupling said shift register to said memory to control the parallel transfer of information between said memory and said shift register; a first circulating register for serially processing information in successive word times and having at least two intermediate access points at the last two bit positions thereof; a second circulating register for serially processing information in successive word times and having at least two intermediate access points at the last two bit positions thereof; a three-input adder-subtractor network; first and second carry flip-flops for said network; three selector gates coupled to the different input terminals of said three-input adder-subtractor networks; and further logic circuitry coupled to the input and output of each of said registers, to the intermediate access points of said first and second circulating registers; to said selection gates, to said first and second carry flip-flops, and to the output of said adder-subtractor network for serially circulating information through said registers in response to predetermined operational instructions.

2. The digital computer defined in claim 1 in which said shift register is a flip-flop static register, and in which said intermediate access points of said circulating registers are formed by flip-flops.

3. The digital computer defined in claim 1 in which said circulating registers include glass delay lines.

4. The digital computer defined in claim 1 in which said further logic circuitry is responsive to a selected instruction to perform a double length addition, and in which said further logic circuitry includes a further flip-flop for preserving any carry generated during said double length addition.

5. The digital computer defined in claim 1 in which said further logic circuitry is responsive to a selected instruction to perform a multiplication operation, and in which said further logic circuitry includes further flip-flops for computing the least significant bit of the product, and for checking the least multiplier bit to control the formation of the first partial product.

(References on following page)

References Cited

UNITED STATES PATENTS

| | | | |
|---|---|---|---|
| 2,840,305 | 6/1958 | Williams et al. | 235—167 |
| 2,913,175 | 11/1959 | Williams et al. | 340—172.5 |
| 3,048,332 | 8/1962 | Brooks et al. | 235—157 |
| 3,069,085 | 12/1962 | Coopper et al. | 234—164 |
| 3,077,581 | 2/1963 | Grady | 235—165 |
| 3,116,410 | 12/1963 | La Manna et al. | 340—172.5 X |

MALCOLM A. MORRISON, *Primary Examiner.*

M. P. HARTMAN, *Assistant Examiner.*